United States Patent [19]
Kato et al.

[11] Patent Number: 5,490,815
[45] Date of Patent: Feb. 13, 1996

[54] FUEL-CUT CONTROL SYSTEM FOR AUTOMOBILES WITH LOCK-UP TYPE AUTOMATIC TRANSMISSION

[75] Inventors: Yuuji Kato, Sekiya; Yoshichika Hagiwara, Sagamihara, both of Japan

[73] Assignee: Nissan Motor Co., Ltd., Yokohama, Japan

[21] Appl. No.: 205,469

[22] Filed: Mar. 4, 1994

[30] Foreign Application Priority Data

Mar. 10, 1993 [JP] Japan .................................... 5-049309

[51] Int. Cl.$^6$ .................................................. B60K 41/02
[52] U.S. Cl. ................................................ 477/181; 477/90
[58] Field of Search .............................. 477/181, 54, 62, 477/90

[56] References Cited

U.S. PATENT DOCUMENTS

| | | | |
|---|---|---|---|
| 4,305,487 | 12/1981 | Sunohara | 192/3.28 |
| 4,422,353 | 12/1983 | Suga et al. | 477/54 |
| 4,473,882 | 9/1984 | Suzuki et al. | 364/424.1 |
| 4,484,497 | 11/1984 | Hibino | 477/181 X |
| 4,580,465 | 4/1986 | Omitsu | 364/424.1 |
| 4,653,007 | 3/1987 | Osanai et al. | 477/48 X |
| 4,891,759 | 1/1990 | Kato | 477/107 X |
| 4,944,199 | 7/1990 | Okino et al. | 477/62 |
| 4,957,194 | 9/1990 | Sana et al. | 477/169 |
| 5,085,301 | 2/1992 | Imamura et al. | 477/181 X |
| 5,146,891 | 9/1992 | Nakazawa et al. | 477/107 X |
| 5,325,946 | 7/1994 | Kashiwabara et al. | 477/65 X |

FOREIGN PATENT DOCUMENTS 62-106174  5/1987  Japan .

*Primary Examiner*—Andrea L. Pitts
*Attorney, Agent, or Firm*—Lowe, Price, LeBlanc & Becker

[57] ABSTRACT

A fuel-cut control system for an automobile is equipped with an engine with a fuel-cut device and an automatic transmission with a lock-up torque converter, and includes a step-by-step fuel-recover device which cooperates with the fuel-cut device and is responsive to transition from coasting to acceleration running, for recovering each of engine cylinders from fuel-cut step-by-step, while continuing a locked-up state of the torque converter in its lock-up range during the transit.

4 Claims, 4 Drawing Sheets

FUEL-CUT CONTROL SYSTEM FOR AUTOMOBILES WITH LOCK-UP TYPE AUTOMATIC TRANSMISSION

BACKGROUND OF THE INVENTION

1. Field of the Invention

The present invention relates to a fuel-cut control system which is suitably applied to automotive vehicles equipped with both an internal combustion engine with a fuel-cut device and a lock-up type automatic transmission.

2. Description of the Prior Art

An automotive automatic transmission has a torque converter which provides varying the drive ratios between a drive member (pump impeller) and a driven member (turbine runner), thus providing varying amounts of torque increase and provides absorbing torque fluctuations. Such a torque converter experiences relative movement (also called converter slip) between the drive and driven members. Thus, an efficiency of torque transmission in automatic transmissions is generally inferior to that in manual transmissions. In order to solve the above-mentioned problem, recently, there has been proposed and developed a lock-up type automatic transmission equipped with a lock-up torque converter. One such lock-up torque converter has been disclosed in U.S. Pat. No. 4,305,487. The lock-up torque converter employs a lock-up mechanism which is operable for directly and mechanically interconnecting the converter cover and the turbine runner to transmit engine power from the crankshaft directly to the turbine runner in a lock-up piston operating range (generally abbreviated as a "lock-up range"). As is generally known, relatively large torque fluctuations can occur at low speeds such as 40 km/h or less, for example. In contrast, there are less torque fluctuations at medium and high speeds. For the reasons set forth above, the lock-up range is usually set to be substantially equivalent to medium and high speed ranges in which it is unnecessary to multiply torque produced by the power plant (engine) and to absorb torque fluctuations. Owing to the direct connection between the engine crankshaft and the transmission input shaft, fuel economy can be remarkably improved in the lock-up range in which the lock-up piston or clutch is engaged.

In consideration of fuel consumption, many of the above-noted automobile with a lock-up type automatic transmission further include a fuel-cut device so as to stop fuel supply to the engine during coasting of the vehicle, i.e., when the acceleration pedal is released. The fuel-cut device in general functions to perform a fuel-cut operation during coasting and to restart fuel-supply upon the vehicle running state is changed from coasting to acceleration running. The fuel-cut device also operates to restart fuel-supply to the engine in order to prevent the engine from being stopped, in the event that the engine revolution speed becomes less than a predetermined lower limit even during coasting.

In automobiles equipped with a power unit which includes a power plant with a fuel-cut device and a lock-up type automatic transmission in combination, the vehicle experiences rapid increase in output power of the engine owing to re-start of the fuel-supply, at a particular timing wherein the fuel system is transited from the fuel-cut state to the fuel-supply state in response to shift from coasting to acceleration running. In this case, if the lock-up torque converter was conditioned in the lock-up range, the vehicle occupants would feel uncomfortable shock and vibrations owing to a rapid increase in positive torque fluctuations in the torque converter. To avoid this, Japanese Patent First Publication No. 62-106174 proposes and teaches a temporary release of the lock-up clutch even in the lock-up range when the fuel-cut is released, i.e., the fuel-supply is resumed or recovered in response to shifting from the coasting state to the acceleration running state. Such temporary release of the lock-up clutch can effectively attenuate shocks and vibrations during the fuel-recovery operation. The temporary release operation of the lock-up clutch may be traded off to an acceleration performance of the vehicle, and to such a good direct drive feeling as direct connection obtainable in manual transmissions. In other words: the temporary release operation causes the drivability to deteriorate due to torque loss.

SUMMARY OF THE INVENTION

It is, therefore in view of the above disadvantages an object of the present invention to provide an improved fuel-cut control system for an automotive vehicle equipped with both an engine with a fuel-cut device and a lock-up type automatic transmission, which can effectively reduce shock and vibrations created during fuel-recovery operation without providing the temporary release of the lock-up clutch.

It is another object of the invention to provide a fuel-cut control system which can provide a step-by-step fuel-recovering operation in a transient state at which the vehicle behaviour is changed from coasting to acceleration running.

In order to accomplish the aforementioned and other objects of the invention, a fuel-cut control system for an automotive vehicle having an automatic transmission equipped with a lock-up torque converter which includes a lock-up clutch for connecting an engine crankshaft directly to a transmission input shaft in a lock-up range so as to transmit an engine power to driven wheels through the torque converter which is conditioned in its locked-up state by engagement of the lock-up clutch during coasting, comprises a fuel-cut device for stopping fuel-supply to an engine, and a step-by-step fuel-recover means cooperative with the fuel-cut device and responsive to transit from coasting to acceleration running, for recovering each of engine cylinders from fuel-cut step by step.

According to another aspect of the invention, a fuel-cut control system in combination with a fuel-cut device for controlling the fuel-cut device attached to an internal combustion engine coupled with an automatic transmission with a lock-up torque converter which connects an engine crankshaft directly to a transmission input shaft in a lock-up range to transmit an engine power through the torque converter conditioned in its locked-up state to driven wheels during coasting, comprises a step-by-step fuel-recover means cooperative with the fuel-cut device and responsive to transit from coasting to acceleration running, for recovering each of engine cylinders from fuel-cut step by step, while continuing the locked-up state of the torque converter in the lock-up range during the transit. It is preferable that the step-by-step fuel-recover means recovers each cylinder from fuel-cut in turn at regular time intervals.

According to a further aspect of the invention, a fuel-cut control system in combination with a fuel-cut device for controlling the fuel-cut device attached to an even-numbered cylinder engine coupled with an automatic transmission with a lock-up torque converter which connects an engine crankshaft directly to a transmission input shaft in a lock-up range to transmit an engine power through the torque converter conditioned in its locked-up state to driven wheels during coasting, comprises a step-by-step fuel-recover means cooperative with the fuel-cut device and responsive to transit from coasting to acceleration running, for recovering half of engine cylinders from fuel-cut in turn, while continuing the locked-up state of the torque converter in the lock-up range during the transit.

DESCRIPTION OF THE PREFERRED EMBODIMENTS

Figure 2:
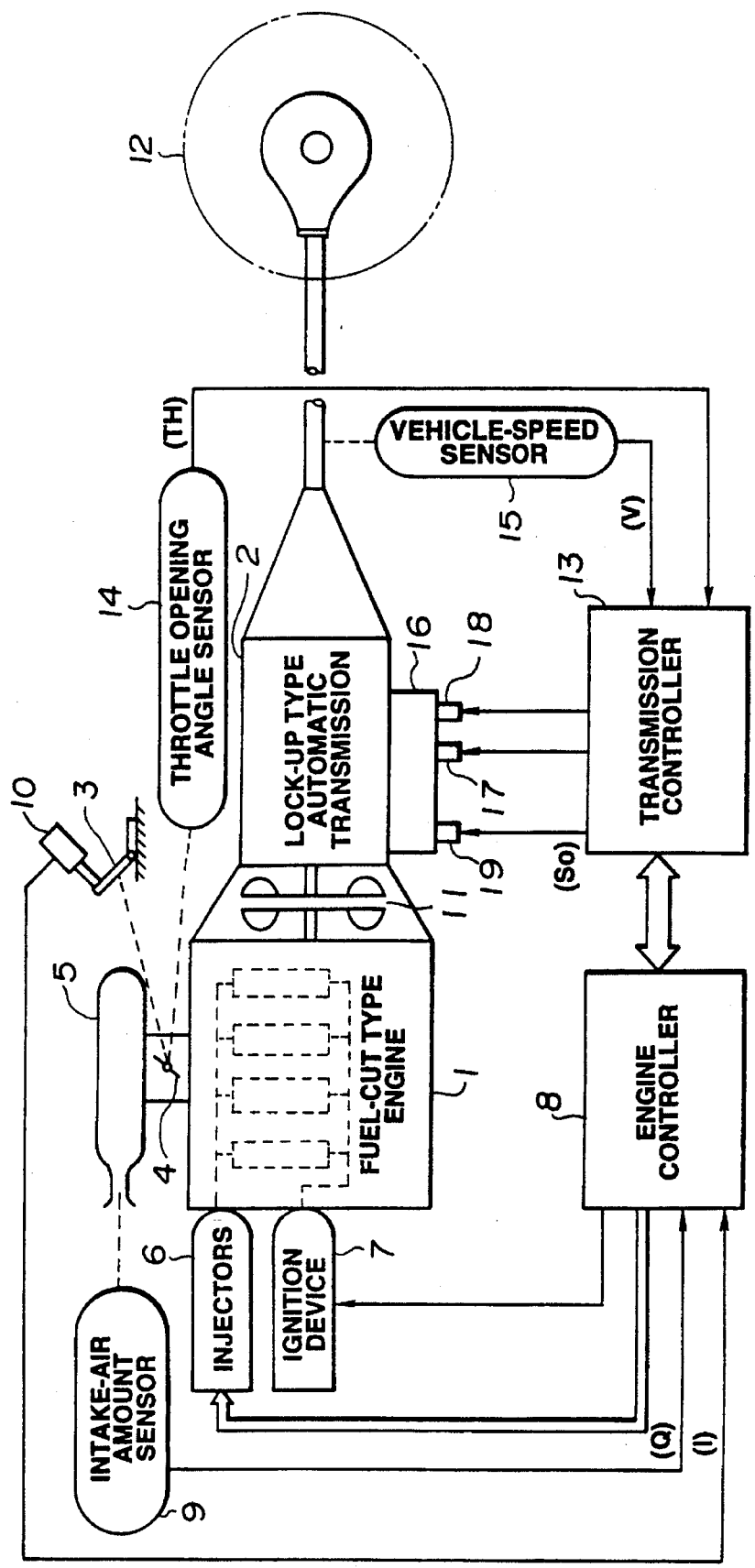
FIG. 2 is a system diagram illustrating one embodiment of a fuel-cut control system according to the invention.

Referring now to the drawings, particularly to FIG. 2, reference numeral 1 denotes an internal combustion engine with a fuel-cut device, while reference numeral 2 denotes an automatic transmission with a lock-up converter. The engine 1 includes a throttle valve 4 which increases the opening angle of the throttle in accordance with the depression amount of an accelerator pedal 3 and introduces intake-air via an air cleaner 6 with the volume proportional to the engine revolutions. The engine 1 also includes an ignition device 7 and a group of injectors 6 each of which is attached onto either one of cylinders. An engine controller 8 controls the amount of fuel-injection and the timing of injection of each injector 6 and the ignition timing of the ignition device 7 in a conventional manner. In order to correct control to the injectors 6 and the ignition device 7, the engine controller 8 receives various signals, namely a signal representative of an amount Q of intake-air detected by an intake-air amount sensor or an air flow meter 9 and an idle switch signal I produced by an idle switch 10. The idle switch 10 consists of a normally-closed type switch which is switched ON only when the accelerator pedal 3 is released, and switched OFF when the accelerator pedal 3 is depressed. The idle switch is connected to receive a high voltage through resisters disposed in the engine controller (ECU). When the accelerator is released and thus the idle switch 10 is shifted to its closed position, one terminal of the idle switch is grounded, thereby shifting a high-voltage signal to a low-voltage signal such as zero voltage. The idle switch signal I is in general represented as the above-mentioned high-voltage signal or low-voltage signal. Based on the above-noted input information Q and I, the engine controller 8 generates command signals to the fuel-injectors 6 in response to the operating condition of the engine, in such a manner as to inject a predetermined amount of fuel into the selected cylinder and to perform a fuel-cut operation so as to stop the fuel-supply to all of the cylinders during coasting of the car. Additionally, the engine controller 8 adjusts the ignition timing of each cylinder in response to the engine running condition such as engine load and engine speed by means of the ignition device 7, thereby enhancing an efficiency of combustion. In this manner, the engine condition is maintained appropriately by way of the engine controller 8 depending on the vehicle running condition. Moreover, the fuel-cut operation is properly executed during coasting, to ensure good fuel-economy of the engine.

The previously-described conventional control of the engine controller 8 will be hereinafter referred to as a "usual fuel-injection control".

Engine power is transmitted from a torque converter 11 to the automatic transmission 2. Although it is not clearly shown in FIG. 2, the torque converter 11 consists of a conventional lock-up torque converter. The lock-up torque converter 11 is maintained in a lock-up state within a predetermined lock-up range in which it is unnecessary for both the torque-multiplication and the torque-fluctuation absorption. In general, the lock-up torque converter 11 employs a lock-up clutch (not shown) to connect the engine crankshaft directly to the transmission input shaft (turbine shaft) by way of engagement of the clutch in the lock-up state. Out of the lock-up range, the torque converter 11 is conditioned in a torque converting state in which the lock-up clutch is released. The automatic transmission 2 conventionally includes a power train, although the power train itself is not shown for the sake of illustrative simplicity. The power train of the transmission 2 is arranged for transmitting torque to the driven wheel 12 at a gear ratio based on a selected shift range.

A transmission controller 13 is provided for executing both the gearshift control and the locking-up control in the lock-up type automatic transmission 2. The transmission controller 13 receives various signals, one being a throttle opening angle indicative signal TH generated by a throttle opening angle sensor 14 and the other being a vehicle speed indicative signal V generated by a vehicle speed sensor 15. The transmission controller 13 evaluates the vehicle running condition based on the signals TH and V, and determines a gearshift position suitable for the evaluated vehicle running condition. Based on the determined gearshift position, the controller 13 generates command signals to shift solenoids 17 and 18 through which the transmission is upshifted or downshifted. The transmission controller 13 determines on the basis of the input information T H and V whether or not the vehicle is conditioned in a particular driving range i.e., the previously described lock-up range wherein the torque multiplication and the torque-fluctuation absorbing action are both unnecessary. When the controller 13 determines that the vehicle is conditioned in the lock-up range, the controller 13 generates a lock-up solenoid control signal S o (100%-duty signal) for activating a lock-up solenoid 19 incorporated in a control valve unit 16 to establish a locking-up state in the lock-up converter 11. On the other hand, when the controller 13 determines that the vehicle is conditioned out of the lock-up range, the controller 13 generates a zero-duty signal S o to the lock-up solenoid 19, thereby causing the solenoid 19 to be deactivated and thus establishing the usual torque-converting state. The input information received by one of the two controllers 8 and 13 is also supplied to the other, in order to certainly achieve an advantageous fuel-cut control executed by the fuel-cut control system according to the invention. The step-by-step fuel-cut control executed by the system of the invention is performed by means of the engine controller 8, will be hereinbelow described in detain in accordance with the control flow of FIG. 3.

Figure 3:
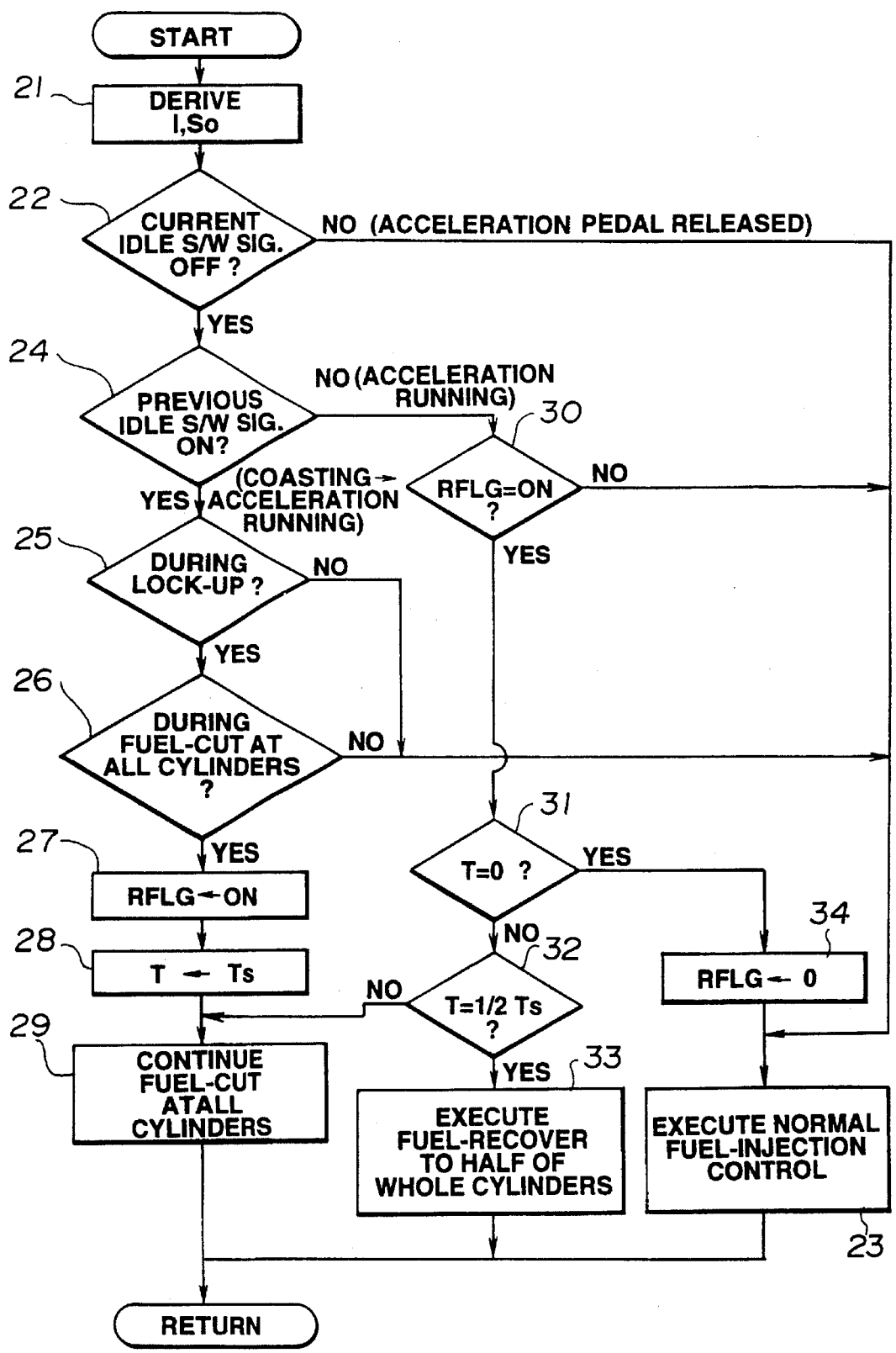
FIG. 3 is a flow chart illustrating a fuel-cut control program executed by the fuel-cut control system of the embodiment.

Referring now to FIG. 3, the routine is executed as time-triggered interrupt routines to be triggered every predetermined time intervals. Actually, the interrupt routine is executed in synchronization with pulse signals each being generated every predetermined crank angles at which selected one of the cylinders has reached to a predetermined angular position. For this reason, the engine controller 8 is further connected to a crank angle sensor (not shown) which is provided for detecting engine revolutions and for the purpose of fuel-injection timing and an ignition timing in a usual manner.

In step 21, the engine controller 8 derives a current idle switch signal I from the idle switch 10 and the lock-up solenoid control signal S o from the transmission controller 13. In step 22, a test is made to determine whether the idle switch 10 is switched OFF, i.e., the accelerator pedal 3 is in depression, on the basis of the current idle switch signal value. When the answer to step 22 is negative (NO), i.e., in case of no-depression of the accelerator pedal or coasting, the procedure jumps to step 23 at which the controller 8 executes the usual fuel-injection control containing the conventional fuel-cut control according to which fuel-cut operation is achieved in respect to all cylinders. During coasting, the fuel-cut control is executed to stop undesired fuel-supply to all of the cylinders and consequently to improve fuel-consumption ratio, since the engine power is almost unnecessary in case of engine revolutions above the predetermined lower limit. In contrast, when the answer to step 22 is affirmative (YES), i.e., in case of the depression state of the accelerator pedal 3, step 24 proceeds in which the controller 8 derives another idle switch signal I which signal is created prior to the above-noted current idle switch signal created one-cycle after and is stored in memories of the controller 8. In step 24, a test is made to determine whether or not the idle switch 10 is switched ON one-cycle before, on the basis of the previously created idle switch signal I. In other words, the two steps 22 and 24 are provided to judge whether the vehicle is conditioned in a transient state from coasting to acceleration running. During shifting from coasting to acceleration running, i.e., when the answer to step 24 is affirmative, the procedure enters step 25. In step 25, a test is made to determine whether or not the lock-up torque converter 11 is conditioned in the locked-up state. Such test is made on the basis of a value of the lock-up solenoid control signal S o obtainable through an information flow from the transmission controller 13 to the engine controller 8. When the answer to step 25 is negative (NO), i.e., the torque converter 11 is conditioned out of the locked-up state, the control procedure jumps to step 23 explained previously. On the other hand, when the answer to step 25 is affirmative (YES), i.e., the torque converter 11 is conditioned in the locked-up state, step 26 proceeds in which a test is made to determine whether fuel-cut is put into operation at all of the engine cylinders. When fuel-cut operation is executed at all cylinders, i.e., fuel-supply to all cylinders is stopped, step 27 proceeds in which a fuel-recover flag RFLG becomes ON or is set to "1", so as to re-start or recover fuel-supply to selected cylinders but not all cylinders, through subsequent steps. Subsequently to step 27, step 28 proceeds in which a time T of a subtraction timer is set to a predetermined time Ts. Note that the timer is a subtraction timer according to which the set time of the timer is gradually decreased to zero. In step 29, the controller 8 operates to continue the fuel-cut operation at all cylinders.

In the event that the answer to step 24 is negative (NO), i.e., the controller 8 judges that the acceleration running is still continued, step 30 proceeds in which a test is made to determine whether or not the fuel-recover flag RFLG is ON and to check that the fuel system is brought into the fuel-supply recovering operation. The fuel-supply recovering operation will be hereinafter abbreviated as a "fuel-recover operation". The answer to step 30 is affirmative (YES), step 31 enters in which a test is made to determine that the time T of the subtraction timer has reached to zero. When the time T of the timer has not yet reached zero, step 32 proceeds to determine whether the time of the timer has reached to ½ Ts. When the answer to step 32 is negative (NO), i.e., in the event that the time T has not yet reached ½ Ts (half of the set time Ts), the procedure shifts to step 29 to continue the fuel-cut operation at the whole cylinders. When the answer to step 32 is affirmative (YES), i.e., upon the time T has reached to ½ Ts, the fuel-recover operation is first executed in respect to half of the whole cylinders at step 33. Thereafter, the subsequent control procedure flows again from step 33 through steps 21, 22, 24, and 30 to step 31, in that order. In step 31, upon the time T has reached to zero, the procedure advances from step 31 to step 34 at which the fuel-recover flag RFLG is reset to "0" in order to terminate one-cycle of the fuel-recover operation. Thereafter, the procedure reaches step 23. Note that the controller 8 generates control commands to the fuel-injectors associated with the remaining cylinders held in the fuel-cut state to permit fuel-supply to those cylinders in conformance with the usual fuel-injection control. In this manner, fuel-supply to the whole cylinders is recovered. As appreciated, shifting the fuel-recover flag RFLG from "1" to "0" results in a flow from step 30 to step 23. Thus, the engine is operated according to the usual fuel-injection control upon termination of one-cycle of the fuel-recover operation. In the embodiment, the fuel-recover operation is executed as illustrated in the timing chart of FIG. 4, based on the comparative results from the respective steps 31 and 32.

Figure 4:
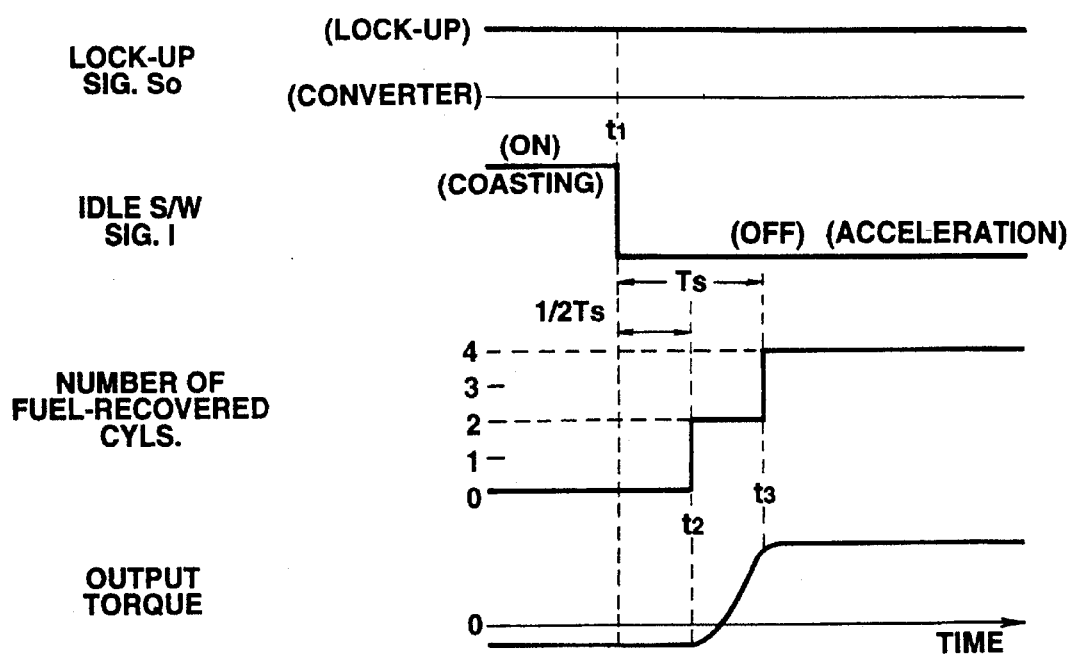
FIG. 4 is a timing chart reflecting the fuel-cut control operation of the control system according to the invention.

Referring now to FIG. 4, $t_1$ designates a time point at which the vehicle running condition is shifted from coasting to acceleration running. As seen in FIG. 4, the fuel-cut operation is continued at all cylinders according to the flow from step 31 via step 32 to step 29, until half the timer set-time Ts has elapsed from the time point $t_1$. In the embodiment, since the fuel-cut control system of the invention is exemplified in case of four-cycle four-cylinder gasoline engine, fuel-cut to two cylinders is released according to the flow from step 32 to 33 at a time point $t_2$ at which half of the set time Ts has elapsed. Thereafter, fuel-cut to the remaining two cylinders is further released according to the procedure flowing front step 31 via step 34 to step 23 at a time point $t_3$ at which the time T of the timer has counted down to zero. As appreciated from the torque characteristic curve illustrated in the lowermost chart of FIG. 4, the output torque produced by the transmission 2 is moderately increased for the predetermined set time Ts of the subtraction timer.

As will be appreciated from the above, fuel-supply to all cylinders which are kept in the fuel-cut state, is not simultaneously recovered, but stepwisely recovered during shifting from coasting to acceleration running, with the result that the fuel-cut control system according to the invention prevents excessively rapid increase in output torque generated by the transmission and assures a moderate increase in the output torque. In other words, the system of the invention can suppress undesired shocks and vibrations occurring during fuels-recover, recover, while maintaining the lock-up torque converter in its locked-up state. As set forth above, the fuel-cut control system of the invention does not require the previously described temporary releasing operation in respect to the lock-up clutch in the transient state from coasting to acceleration running, even when the torque converter is conditioned within the lock-up range. Accordingly, in the transient state from coasting to acceleration running, the system of the invention can provide a satisfactory direct-drive feeling similar to a direct connection obtainable in manual transmissions, thereby improving fuel-consumption ratio.

Figure 1:
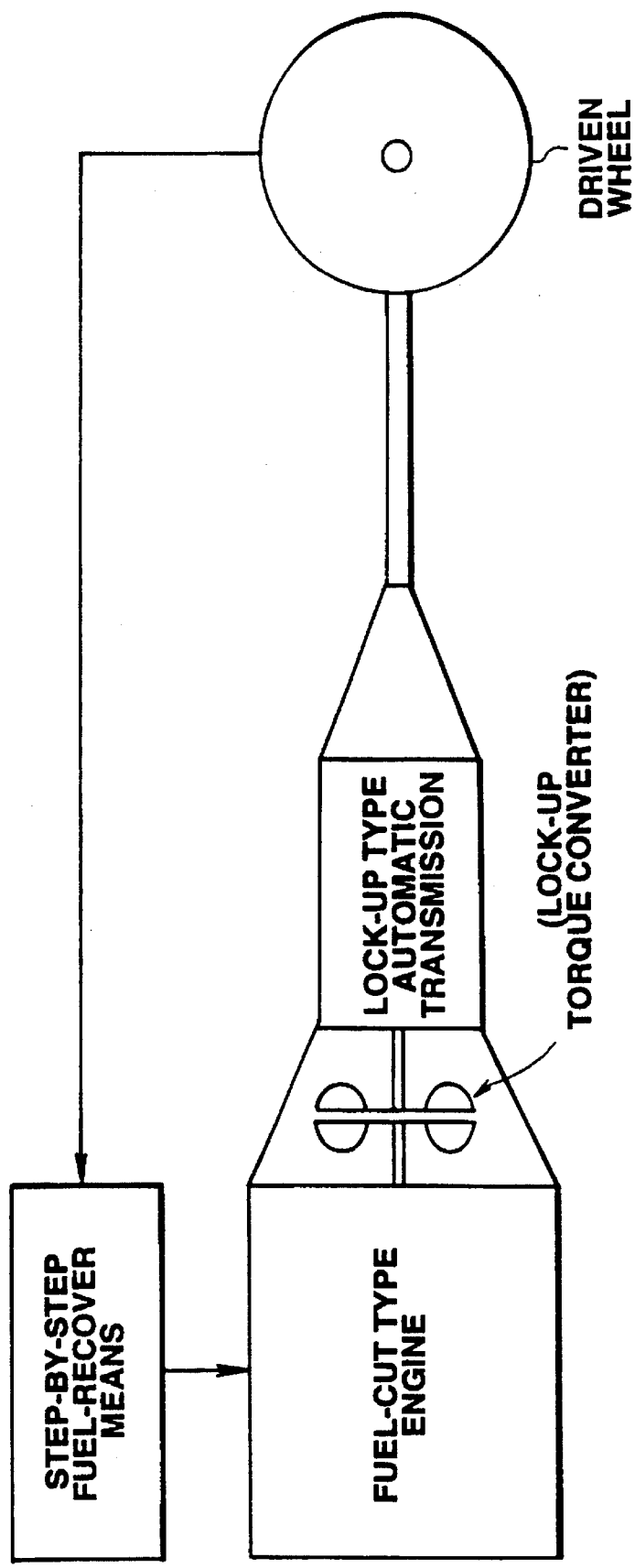
FIG. 1 is a schematic diagram illustrating a fuel-cut control system for an automobile in combination with a lock-up type torque converter.

Returning to FIG. 1, in an automobile equipped with both an engine with a fuel-cut device and a lock-up type automatic transmission, a fuel-recover operation for respective engine cylinders is performed by a step-by-step fuel-recover means which functions to release fuel-cut to each cylinder in a stepwise fashion during shifting to acceleration running after coasting wherein the lock-up converter of the transmission is conditioned in its locked-up state and additionally the fuel-cut device is activated to establish fuel-cut operation to whole cylinders.

Although the fuel-cut control system of the invention is exemplified in case of the four-cycle four-cylinder gasoline engine, the system of the invention may be applied to automobiles employing a diesel engine with a fuel-cut device and a lock-up type automatic transmission in combination.

Although the fuel-recover operation is executed to half of all cylinders (four cylinders in case of four-cylinder engine) and subsequently executed to the remaining half, it is preferable to recover fuel-supply to each cylinder in turn so as to insure a more smooth and moderate increase in output torque of the transmission in a transient state from coasting to acceleration running. For instance, it is advantageous to provide a step-by-step fuel-recover operation in respect to each cylinder, so that, in case of a four-cylinder engine, a first cylinder is recovered from fuel-cut when ¼ Ts has elapsed, a second cylinder is recovered from fuel-cut when ²⁄₄ Ts has elapsed, a third cylinder is recovered from fuel-cut when ¾ Ts has elapsed, and finally a fourth cylinder is recovered from fuel-cut when ⁴⁄₄ Ts has elapsed. In this manner, it is preferable that each cylinder may be recovered from fuel-cut at regular time intervals such as ¼ Ts in the above-mentioned modification.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A fuel-cut control system for an automotive vehicle having an automatic transmission equipped with a lock-up torque converter which includes a lock-up clutch for connecting a crankshaft of a vehicle engine having a plurality of cylinders directly to the transmission output shaft in a lock-up range so as to transmit power from the engine to driven wheels of the vehicle through the torque converter which is conditioned in its locked-up state by engagement of the lock-up clutch during coasting, said system comprising:

a fuel-cut device for stopping fuel-supply to the engine; and a step-by-step fuel recover means for cooperative with said fuel-cut device and responsive to transition of engine operation from coasting to acceleration running for stepwise recovering of each of the engine cylinders from fuel-cut in turn, while continuing the locked-up state of said torque converter in said lock-up range during said transition.

2. A fuel-cut control system in combination with a fuel-cut device for controlling the fuel-cut device attached to a multi-cylinder internal combustion engine of a vehicle coupled with an automatic transmission with a lock-up torque converter which connects an engine crankshaft directly to a transmission input shaft in a lock-up range to transmit engine power through the torque converter conditioned in its locked-up state to driven wheels during coasting, said system comprising:

a step-by-step fuel-recover means cooperative with said fuel-cut device and responsive to transition of engine operation from coasting to acceleration running for stepwise recovering each of the engine cylinders from fuel-cut in turn while continuing the locked-up state of said torque converter in said lock-up range during said transition, wherein said step-by-step fuel-recover means recovers each cylinder from fuel-cut in turn at regular time intervals.

3. A fuel-cut control system in combination with a fuel-cut device for controlling the fuel-cut device attached to an even-numbered cylinder engine coupled with an automatic transmission with a lock-up torque converter which connects an engine crankshaft directly to a transmission input shaft in a lock-up range to transmit an engine power through the torque converter conditioned in its locked-up state to driven wheels during coasting, said system comprising:

a step-by-step fuel-recover means cooperative with said fuel-cut device and responsive to transition of engine operation from coasting to acceleration running, for recovering half of engine cylinders from fuel-cut in turn, while continuing the locked-up state of said torque converter in said lock-up range during said transition.

4. The fuel-cut control system for as set forth in claim 3, wherein said step-by-step fuel-recover means recovers half of said cylinders front fuel-cut in turn at regular time intervals.

* * * * *